US007203324B2

(12) United States Patent
Kreifeldt et al.

(10) Patent No.: US 7,203,324 B2
(45) Date of Patent: Apr. 10, 2007

(54) AUDIO FEEDBACK PROCESSING SYSTEM

(75) Inventors: Richard A. Kreifeldt, Sandy, UT (US); Curtis R. Reed, Salt Lake City, UT (US); Aaron M. Hammond, Eagle Mountain, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 167 days.

(21) Appl. No.: 10/387,915

(22) Filed: Mar. 13, 2003

(65) Prior Publication Data

US 2003/0210797 A1 Nov. 13, 2003

Related U.S. Application Data

(60) Provisional application No. 60/363,994, filed on Mar. 13, 2002.

(51) Int. Cl.
*H04B 15/00* (2006.01)
*H04R 27/00* (2006.01)

(52) U.S. Cl. ............................ 381/93; 381/83; 381/96

(58) Field of Classification Search ............ 381/95–96, 381/83, 93, 317, 318, 94.1, 94.2, 94.3, 98
See application file for complete search history.

(56) References Cited

U.S. PATENT DOCUMENTS

| | | | | |
|---|---|---|---|---|
| 4,079,199 | A | | 3/1978 | Patronis, Jr. |
| 4,238,746 | A | | 12/1980 | McCool et al. |
| 4,602,337 | A | | 7/1986 | Cox |
| 4,658,426 | A | | 4/1987 | Chabries et al. |
| 5,029,217 | A | | 7/1991 | Chabries et al. |
| 5,046,101 | A | | 9/1991 | Lovejoy |
| 5,245,665 | A | | 9/1993 | Lewis et al. |
| 5,442,712 | A | * | 8/1995 | Kawamura et al. ........... 381/83 |
| 5,677,987 | A | | 10/1997 | Seki et al. |
| 5,710,823 | A | | 1/1998 | Nagata et al. |
| 5,717,772 | A | * | 2/1998 | Lane et al. .................. 381/93 |
| 5,748,751 | A | * | 5/1998 | Janse et al. .................. 381/93 |
| 5,999,631 | A | * | 12/1999 | Porayath et al. .............. 381/93 |

(Continued)

FOREIGN PATENT DOCUMENTS

| | | | |
|---|---|---|---|
| DE | 198 14 180 | C | 10/1999 |
| EP | 1 298 643 | A1 | 4/2003 |
| WO | WO 01 97212 | A | 12/2001 |

*Primary Examiner*—Xu Mei
(74) *Attorney, Agent, or Firm*—Brinks Hofer Gilson & Lione

(57) ABSTRACT

This invention is an audio system capable of identifying frequencies of feedback signals and filters these feedback signals. Frequency interpolation is utilized on a sampled frequency spectrum signal corresponding to a feedback signal, where the frequency interpolation allows the frequency of the feedback signal to be identified, especially where the frequency lies between samples of the frequency spectrum signal. The frequency identification allows a less intrusive filter, such as a notch filter, to be placed at the determined frequency of the feedback to eliminate the feedback signal. The placement of the notch filter reduces the effect on the audio signal provided by the audio system. The audio system may provide adaptive filtering of multiple feedback signals, using a single filter such as a notch filter. The single notch filter is configured to filter the more than one feedback signal, thereby freeing-up notch filters for filtering other feedback signals, or for reducing memory and processing requirements for the processor of the system.

41 Claims, 12 Drawing Sheets

U.S. PATENT DOCUMENTS 6,058,194 A 5/2000 Gulli et al.
6,125,187 A * 9/2000 Hanajima et al. ............. 381/83
6,539,096 B1 3/2003 Sigwanz et al.
6,690,805 B1 * 2/2004 Tsuji et al. ................ 381/94.1
2006/0056644 A1 * 3/2006 Kreifeldt et al. .............. 381/96

* cited by examiner

AUDIO FEEDBACK PROCESSING SYSTEM

RELATED APPLICATIONS

This application claims priority to U.S. Provisional Patent Application Ser. No. 60/363,994, entitled “Employing Narrow Bandwidth Notch Filters In Feedback Elimination,” and filed on Mar. 13, 2002, and is incorporated by reference.

BACKGROUND OF THE INVENTION

1. Technical Field

This invention generally relates to feedback in audio systems. More particularly, this invention relates to identifying a frequency of feedback and adaptive filtering of feedback signals in an audio system.

2. Related Art

An audio system typically includes an input transducer (microphone), an amplifier, a microprocessor and an audio output (loudspeaker). The input transducer receives sound into the system, the amplifier amplifies the sound, the microprocessor performs signal processing, and the audio output (loudspeaker) provides sound to users of the system. Many audio systems allow for a duplex operation, where sound may be input to the microphone while audio is provided at the speaker. However, when the microphone receives a portion of the audio provided at the speaker as an input, an unstable, closed-loop system is created, resulting in audio feedback.

Audio feedback is manifested as one or more audio feedback signals at the speaker, where each feedback signal may be modeled as a sinusoidal signal (i.e. the feedback signal(s) exhibit characteristics of a sinusoidal signal). To eliminate a particular feedback signal, the microprocessor converts the audio signal into a discrete (sampled) frequency spectrum representation, such as a Discrete Fourier Transform (DFT), Spectral Estimation, Filter Banks, or like representation. The conversion of the audio signal to the sampled frequency spectrum allows for a general identification of the frequency of the feedback signal. The frequency sample having the greatest magnitude in the discrete frequency domain is selected as the frequency of the feedback signal.

A notch filter is placed at the identified frequency of the feedback signal to eliminate that particular feedback signal. However, because of computational and memory limitations of the microprocessor, the sampling resolution of the sampled frequency spectrum representation is limited. Thus, the selected frequency sample does not provide an accurate estimate of an actual frequency of the feedback signal. Because the selected frequency sample is not an accurate estimate, a notch filter is utilized that has a significantly wider bandwidth and/or a greater cut-depth than what is actually necessary for filtering the feedback signal. The wider bandwidth and/or greater cut-depth are necessary to ensure that the feedback signal is eliminated from the output signal. However, the use of a wider bandwidth and/or greater cut-depth notch filter can degrade the audio quality of the sound at the speaker.

The computational and memory limitations of the microprocessor limits the number of notch filters that may be used to eliminate audio feedback signals. Where the number of feedback signals exceeds the number of notch filters available, some of the feedback signals cannot be eliminated by the system. The failure to eliminate at least some of the feedback signals may require a system gain to be reduced, resulting in degraded system performance.

SUMMARY

This invention provides an audio system that identifies the frequency of a feedback signal using interpolative feedback identification. The interpolative feedback identification may be accomplished using frequency interpolation on a sampled frequency spectrum signal corresponding to a feedback signal. The feedback interpolation allows the frequency of the feedback signal to be identified, especially where the frequency of the feedback lies between samples of the frequency spectrum signal. The interpolation may include using samples of the sampled frequency spectrum signal to generate a unique quadratic (or higher order polynomial), which resembles the original main lobe of the feedback signal represented by the frequency spectrum signal. The polynomial may be constructed from the samples using polynomial interpolation, rational function interpolation, cubic spline interpolation, and the like. The peak of the polynomial and thus a representation/estimation of the actual frequency of the feedback signal may be determined, for example, by setting a derivative of the generated polynomial equation to zero. A narrowly tailored filter, such as a notch filter, may be placed at the determined frequency of the feedback to eliminate or reduce the feedback signal. The filter also reduces the effect on the audio signal quality provided by the audio system.

The audio system may adaptively filter multiple feedback signals using a single filter such as a notch filter. The adaptive filtering may include identifying frequencies of feedback in the audio signal, and determining which frequencies of feedback signals lie within a frequency window comprising adjoining samples of the sampled frequency spectrum. A filter, such as a notch filter is configured to filter out the frequencies identified as within a frequency range covered by the frequency window, thereby freeing-up notch filters for filtering other feedback signals, or for reducing memory and processing requirements for the microprocessor of the audio system. The frequency range covered by the frequency window may comprise any number of adjoining samples, and may be predetermined and/or configurable. Further, the frequency range covered by the frequency window may vary depending on the frequency band being examined, and/or the resolution of the sampled frequency spectrum.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
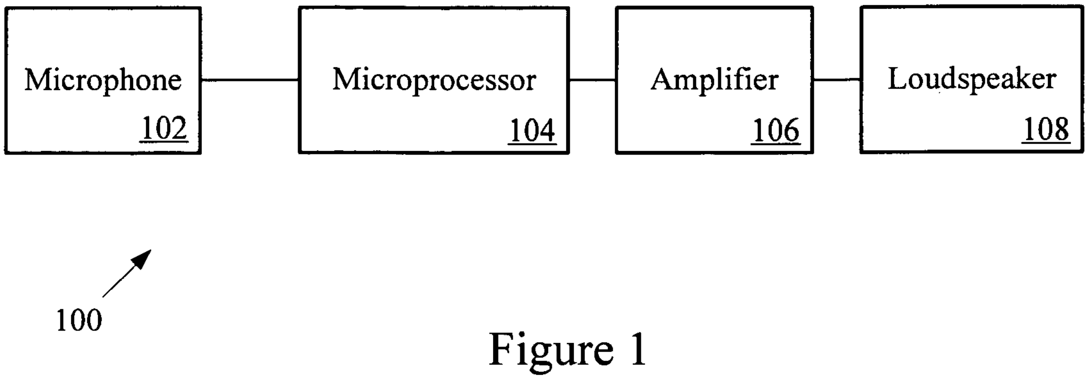
FIG. 1 is a block diagram of an audio system having feedback identification and reduction techniques.

FIG. 1 is a block diagram of an audio system 100 having feedback identification and feedback reduction or elimination techniques. The audio system uses interpolative feedback identification and may adaptively filter multiple feedback signals using one notch filter. The interpolative feedback identification provides for a single estimate of the feedback frequency achieved from more than one sample of a discrete frequency spectrum representation of a feedback signal. The interpolative feedback identification may include utilizing frequency interpolation by generating a second degree or higher polynomial using one or more samples of the discrete frequency spectrum representation. An accurate representation of the actual frequency of the feedback signal may be determined, for example, by setting a derivative of the polynomial to zero. A filter, such as a notch filter, may be placed in response to the interpolative feedback identification to reduce or eliminate the feedback signal with little or no effect on the audio signal quality provided by the audio system. The adaptive filtering involves configuring a filter, such as a notch filter, to eliminate multiple feedback signals, which allow other filters to reduce or eliminate other feedback signals. The adaptive filtering may also, or in the alternative, reduce processor memory and/or computational requirements of the audio system.

The audio system 100 includes an audio input, i.e. a microphone 102, for receiving an audio signal. The microphone 102 is coupled with a microprocessor 104, which is capable of controlling operation of the audio system 100. The microprocessor 104 may perform any analog to digital conversions of audio signals received and digital signal processing. The microprocessor 104 is further capable of performing digital to analog conversions of audio provided by the audio system 100. The microprocessor 104 is coupled with an amplifier 106 capable of amplifying an output audio signal. Amplifier 106 is coupled with a loudspeaker 108 for providing the output audio signal to a user of the audio system. While a particular configuration is shown, the audio system may have other configurations, including those with fewer or additional components.

Figure 2:
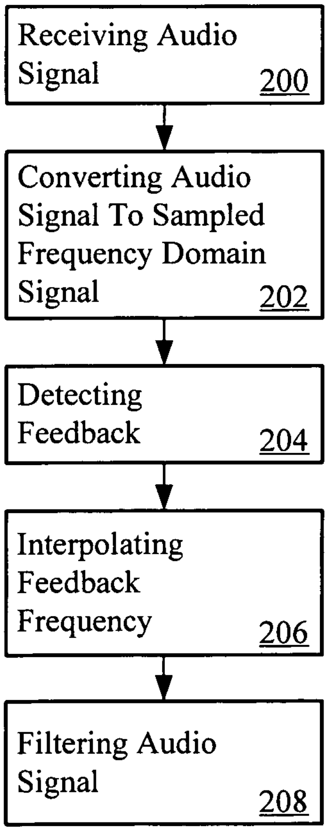
FIG. 2 is a flow chart illustrating operation of the audio system of FIG. 1 in identifying the frequency of a feedback signal.

FIG. 2 is a flow chart of a method for identifying and reducing and/or removing a feedback signal in an audio system. A time-domain audio signal s[n] from the microphone 104 is received 200 at microprocessor 104. Audio feedback may result when one or more portions of the audio provided from loudspeaker 108 is received at microphone 102, thereby causing an unstable, closed-loop system. Microprocessor 104 converts 202 the time-domain audio signal into a sampled frequency-domain signal $|S(K)|$. Microprocessor 104 may use windowing techniques such as Rectangular, Hamming, Bartlet, and like techniques to compute the frequency domain signal. The microprocessor 104 may then detect the feedback. The detection of feedback may include performing frequency spectrum analysis such Discrete Fourier Transform (DFT), Spectral Estimation, Filter Banks, and like techniques. Samples of the frequency domains signal may be used in interpolating 206 to determine the frequency of the feedback signal, and the feedback signal may be filtered 208. Interpolating 206 and filtering 208 will be discussed further below with respect to FIG. 10.

Figure 3:
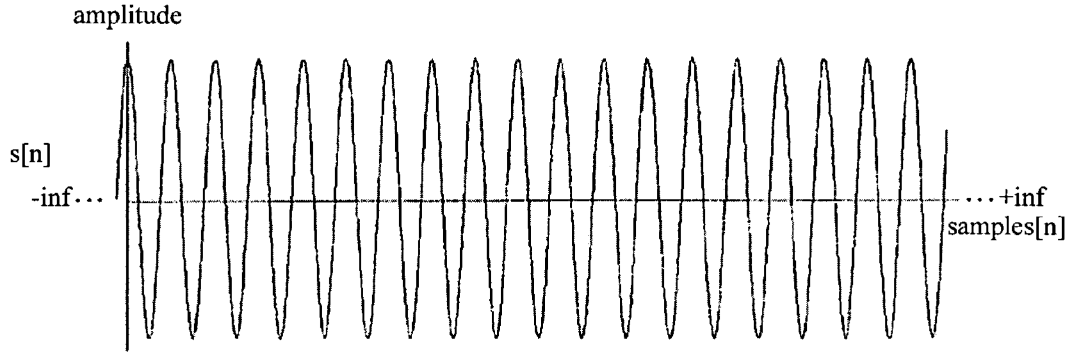
FIG. 3 is a graph illustrating a time-domain feedback signal.
Figure 4:
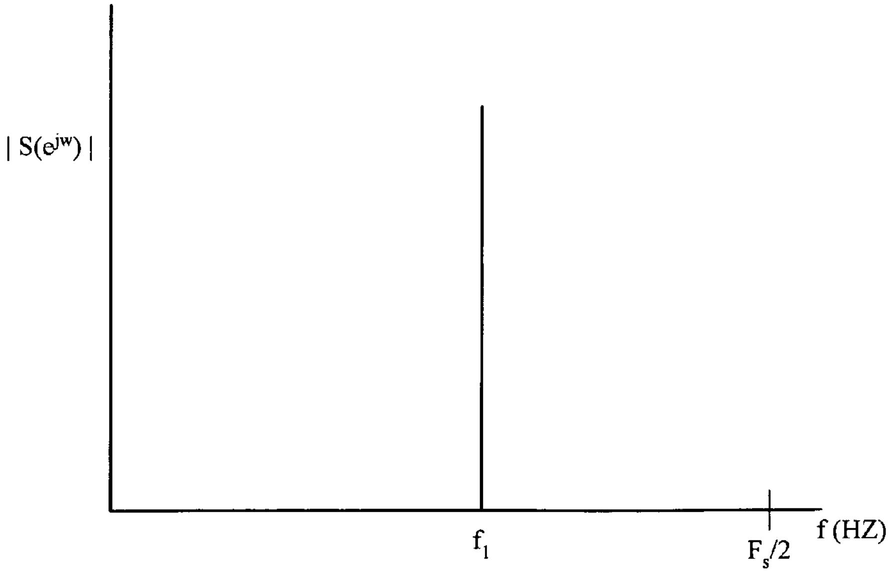
FIG. 4 is a graph illustrating the Discrete Time Fourier Transform of the feedback signal of FIG. 3.
Figure 5:
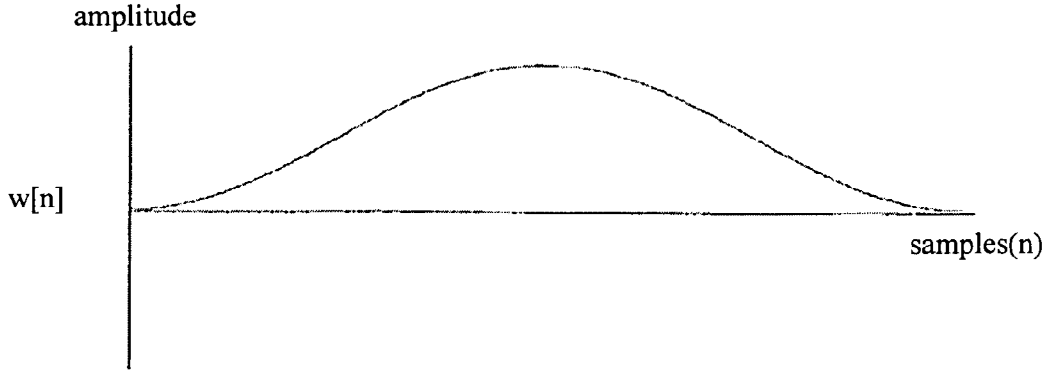
FIG. 5 is a graph illustrating a time-domain window function.
Figure 6:
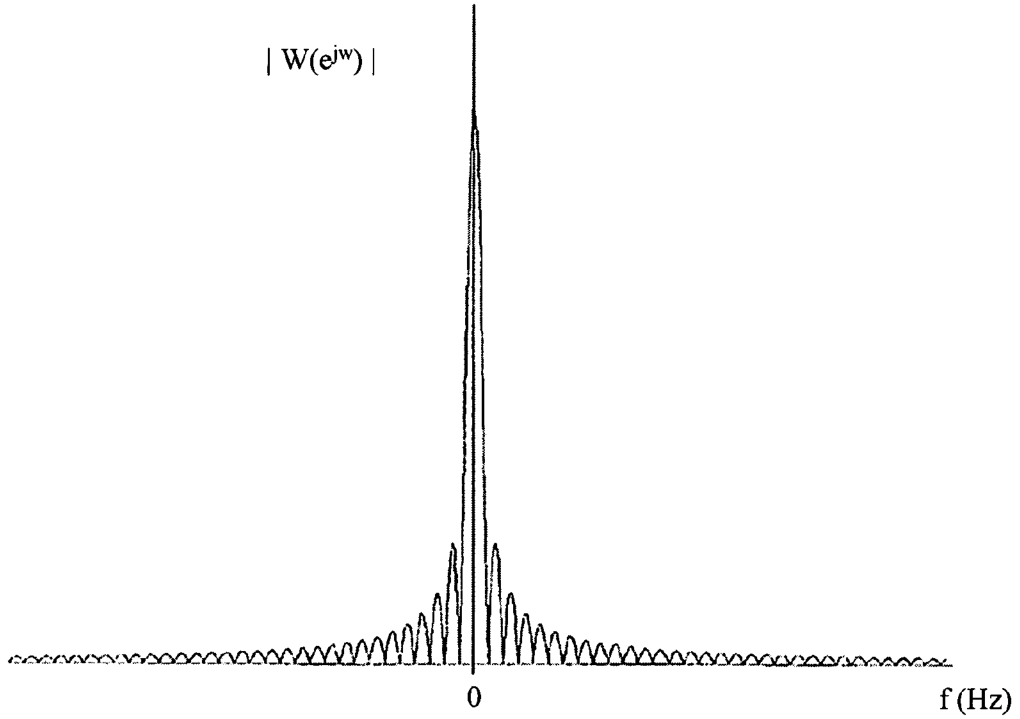
FIG. 6 is a graph illustrating a Discrete Time Fourier Transform of the time-domain window function of FIG. 5.
Figure 7:
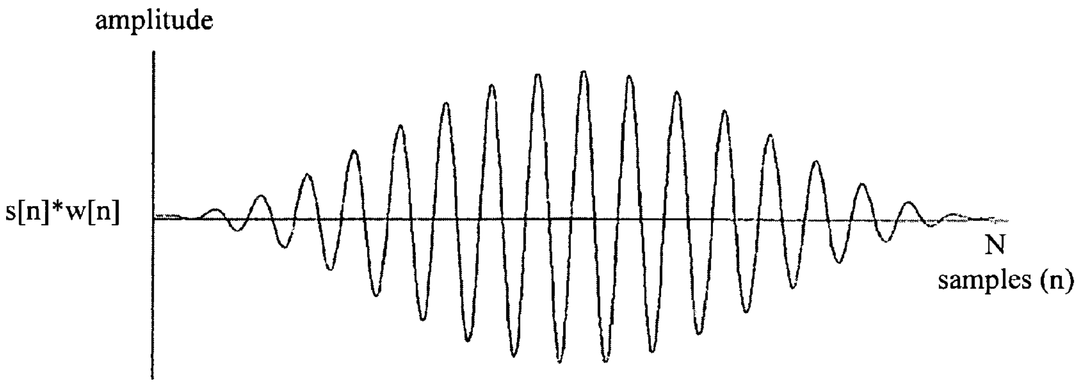
FIG. 7 is a graph illustrating the time-domain signal resulting from multiplying the feedback signal of FIG. 3 with the window function of FIG. 5.
Figure 8:
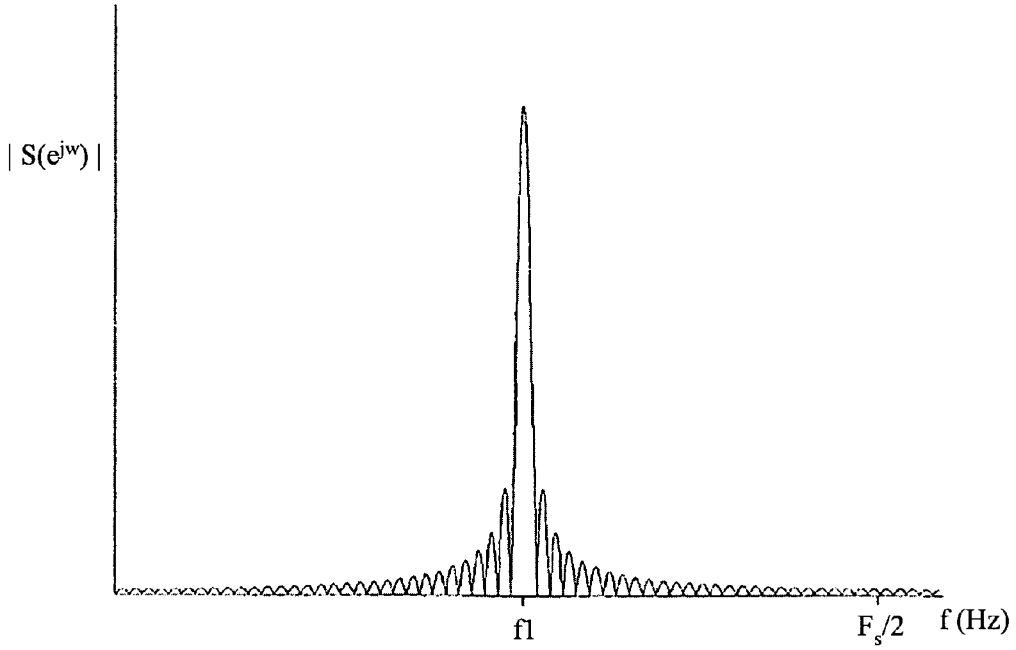
FIG. 8 is a graph illustrating the Discrete Time Fourier Transform of the windowed feedback signal of FIG. 7.
Figure 9:
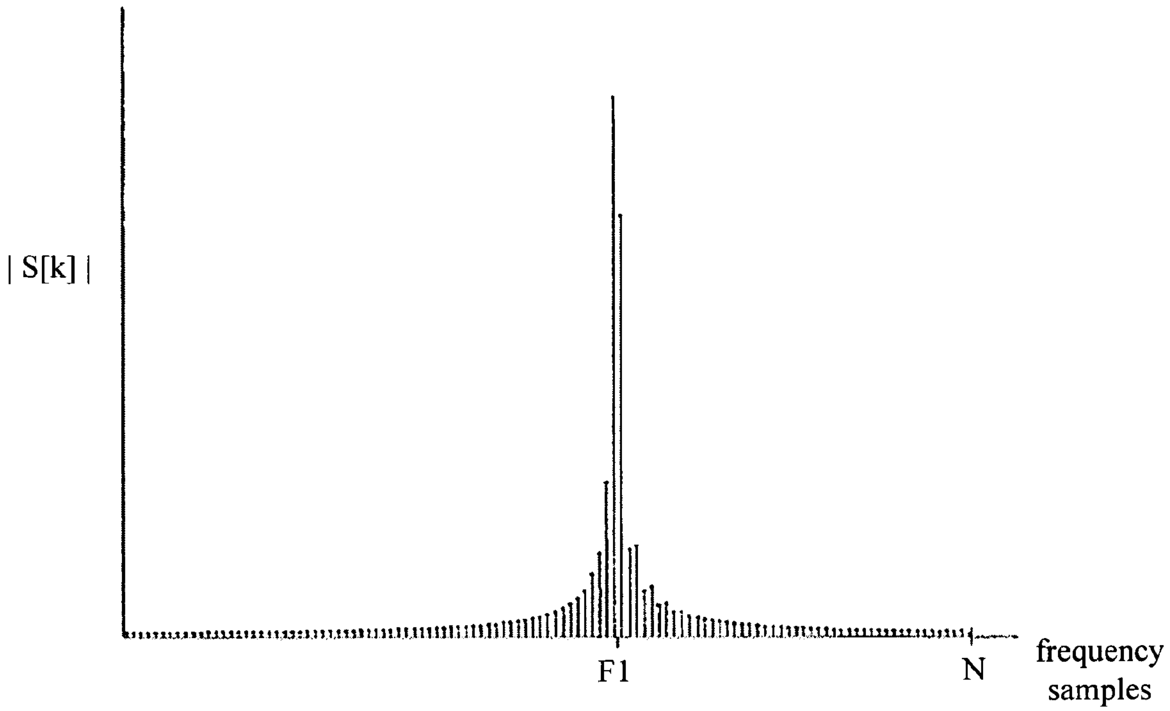
FIG. 9 is a graph illustrating the Discrete Fourier Transform of the of the windowed feedback signal of FIG. 7.
Figure 10:
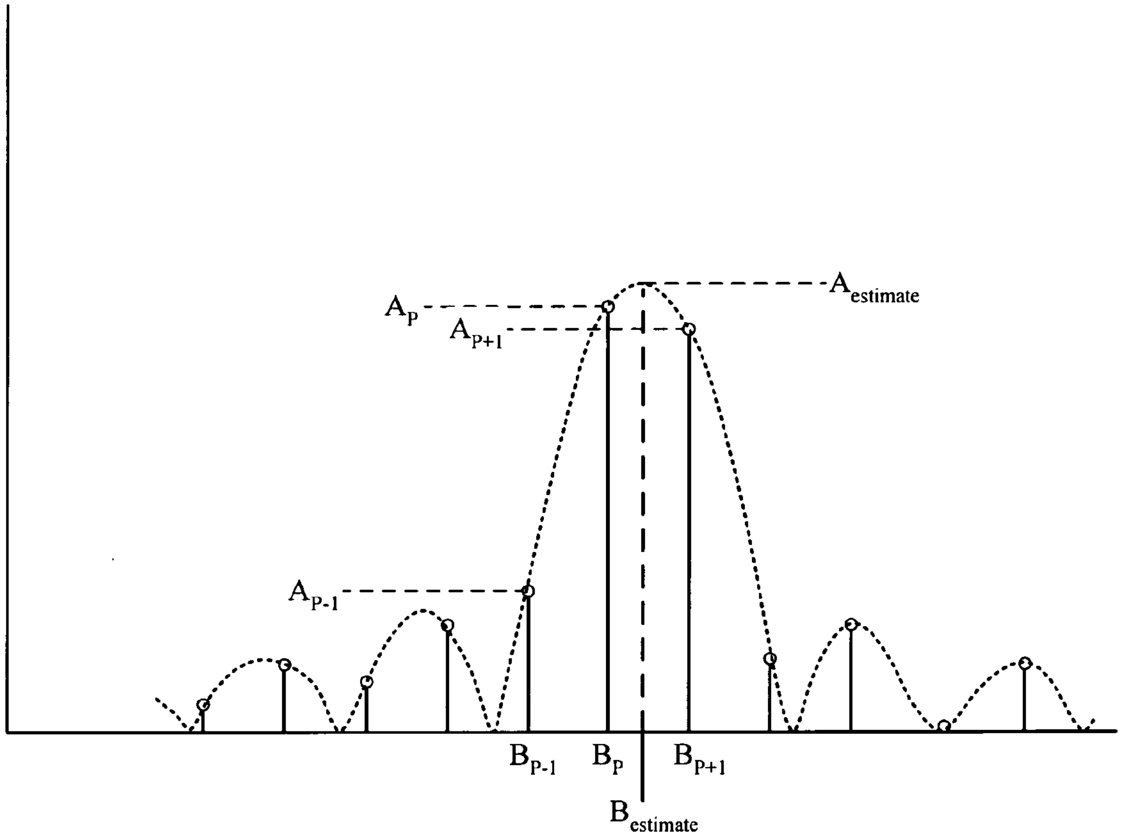
FIG. 10 illustrates an expansion of a portion of the graph of FIG. 9, showing frequency bins which may be utilized in interpolating a frequency of a feedback signal.

FIGS. 3–10 illustrate detecting of the feedback signal by microprocessor 104. FIG. 3 illustrates a time-domain feedback signal s[n]. FIG. 4 illustrates a frequency domain signal $|S(e^{jw})|$ resulting from converting the feedback signal s[n] to the frequency domain using, for example, the Discrete Time Fourier Transform (DTFT). FIG. 5 illustrates a time-domain window function w[n]. FIG. 6 illustrates the DTFT($W|e^{jw})|$) of the window function w[n]. FIG. 7 illustrates the product of the time-domain feedback signal s[n] with the time-domain window function w[n]. FIG. 8 illustrates the windowed frequency domain signal $|\hat{S}(e^{jw})|$ centered about the frequency domain feedback signal $|S(e^{jw})|$, resulting from taking the DTFT of the product of s[n] and w[n]. FIG. 9 illustrates the sampled frequency domain signal $|\hat{S}[k]|$ resulting from taking the DFT of the product of s[n] and w[n]. This is, for example, equivalent to sampling the windowed frequency domain feedback signal $|\hat{S}(e^{jw})|$ of FIG. 8 at equally spaced frequency intervals. FIG. 10 illustrates a portion of the sampled, windowed frequency domain signal $|S[k]|$ of FIG. 9, specifically showing a more detailed view around a main lobe of the feedback signal. The frequency spectrum signals illustrated in FIGS. 4, 6 and 8 are DTFT. The frequency spectrum signals illustrated in FIGS. 9 and 10 are DFTs. Other frequency spectrum analysis techniques may be utilized in converting the time-domain signal to the frequency domain, and analyzing the frequency domain signal.

In the flowchart of FIG. 2, the interpolating 206 provides a single representation/estimation of a feedback frequency determined from multiple samples of the discrete frequency spectrum representation of the frequency signal. The interpolative feedback identification may be determined using frequency interpolation techniques, for example, as will be described with respect to the graph of FIG. 10, where each frequency sample defines a frequency bin. The notations used in FIG. 10 are as follows:

$B_{estimate}$=The estimated frequency of the feedback signal.

$B_p$=Peak (maximum) bin number.

$B_{p-1}$=Bin just below (in frequency) the peak bin number.

$B_{p+1}$=Bin just above (in frequency) the peak bin number.

$A_{estimate}$=Amplitude at the estimated frequency of the feedback.

$A_p$=Amplitude of the peak bin.

$A_{p-1}$=Amplitude of the bin just below (in frequency) the peak bin.

$A_{p+1}$=Amplitude of the bin just above (in frequency) the peak bin.

$B_{estimate}$ is the estimated frequency of the feedback signal which may be determined using the interpolation techniques described below. Ideally, the frequency $B_{estimate}$ will coincide with the actual frequency of the feedback signal. In any event, the frequency $B_{estimate}$ is typically a more accurate estimate of the actual frequency of the feedback signal than the frequency $B_p$ which is selected by systems of the prior art.

Interpolative feedback identification such as frequency interpolation provides a more accurate estimate of the actual frequency of feedback, and may be determined using samples of the DFT |S[k]|. Using the samples of the DFT signal |[S]|, a unique quadratic (or higher order polynomial) may be generated which resembles the original main lobe of the DTFT representing the feedback signal. A polynomial may be reconstructed from the sample points of the DFT |S[k]|. An interpolating polynomial for degree N−1 is illustrated as a LaGrange polynomial by:

$$P(x) = \frac{(x-x_2)(x-x_3)\wedge(x-x_N)}{(x_1-x_2)(x_1-x_3)\wedge(x_1-x_N)}y_1 + \frac{(x-x_1)(x-x_3)\wedge(x-x_N)}{(x_2-x_1)(x_2-x_3)(x_2-x_N)}y_2 + \wedge + \frac{(x-x_1)(x-x_2)\wedge(x-x_{N-1})}{(x_N-x_1)(x_N-x_2)\wedge(x_N-x_{N-1})}y_N$$

Other interpolating polynomial techniques may be used, including polynomial interpolation, rational function interpolation, cubic spline interpolation and the like.

Applying the LaGrange polynomial equation to frequency interpolation (here, for a $2^{nd}$ order quadratic) yields a feedback frequency equation f(B) of:

$$f(B) = \frac{(B-B_p)(B-B_{p+1})}{(B_{p-1}-B_p)(B_{p-1}-B_{p+1})}A_{p-1} + \frac{(B-B_{p-1})(B-B_{p+1})}{(B_p-B_{p-1})(B_p-B_{p+1})}A_p + \frac{(B-B_{p-1})(B-B_p)}{(B_{p+1}-B_{p-1})(B_{p+1}-B_p)}A_{p+1}$$

A peak of the quadratic curve, and thus an estimate/representation of the frequency of the feedback signal may be determined by solving for a maximum of f(B). Solving for the maximum may be accomplished, for example, by taking the derivative of f(B), and setting the derivative to zero, yielding the estimated feedback frequency $B_{estimate}$ as:

$$B_{estimate} = \frac{\dfrac{\lfloor A_{p-1}*(B_p+B_{p+1})(B_p-B_{p-1})(B_p-B_{p+1})}{(B_{p+1}-B_{p-1})(B_{p+1}-B_p)\rfloor}}{2} + \frac{\dfrac{\lfloor A_p*(B_{p-1}+B_{p+1})(B_{p-1}-B_p)(B_{p-1}-B_{p+1})}{(B_{p+1}-B_{p-1})(B_{p+1}-B_p)\rfloor}}{2} + \frac{\dfrac{\lfloor A_{p+1}*(B_{p-1}+B_p)(B_{p-1}-B_p)(B_{p-1}-B_{p+1})}{(B_p-B_{p-1})(B_p-B_{p+1})\rfloor}}{2}$$

The pole of the quadratic curve provides a more accurate representation of the frequency of the feedback signal than the frequency $B_p$ of the peak bin alone. Where it is known that, prior to the interpolation, $A_p$ is greater than both $A_{p+1}$, and $A_{p-1}$, it may be determined that the interpolated polynomial has no minimum at this location, and only a maximum. Thus, taking the derivative of the interpolation polynomial and setting it to zero yields the maximum, and thus the more accurate representation of the frequency of the feedback signal than the frequency $B_p$. However, where it is not known prior to the interpolation that $A_p$ is greater than both $A_{p+1}$, and $A_{p-1}$, it may be necessary to determine that the frequency at $B_{estimate}$ is a maximum and not a minimum of the quadratic equation.

To determine that the frequency at $B_{estimate}$ is a maximum (and not a minimum) of the quadratic equation, a value $A_{estimate}$ may be computed by the microprocessor 104 using the equation for f(B) above, representing the amplitude of the feedback signal at the interpolated frequency $B_{estimate}$. $A_{estimate}$ may be compared with the values $A_{p+1}$ and $A_{-1}$, which are amplitudes of the feedback signal at corresponding frequencies $B_p$ and $B_{p+1}$, to ensure that $A_{estimate}$ has the highest amplitude.

The interpolating 206 of FIG. 2 provides a more accurate estimate of the actual frequency of feedback signal. Using the frequency estimate $B_{estimate}$, a filter may be configured for filtering 208 the feedback of the audio signal. The filter may be a bandwidth notch filter. Other filters may be used. Since a close estimate for the frequency of the feedback signal has been identified using frequency interpolation, the bandwidth notch filter may be configured (i.e., coefficients calculated therefore including Quality Factor and/or gain/cut-depth) by the microprocessor 104 as a narrow bandwidth notch filter capable of filtering-out the frequency of the feedback signal. The microprocessor 104 may also minimize at least one of a bandwidth and a cut-depth of the notch filter. The configured filter may then be placed at the frequency $B_{estimate}$ (i.e. designed with a center frequency of $B_{estimate}$). Such filtering may be employed utilizing filtering techniques such as Finite Impulse Response (FIR) and Infinite Impulse Response (IIR) techniques, or any other filtering technique sufficient for filtering out the feedback signal as would be appreciated by one skilled in the art. Thus, identifying the frequency of the feedback signal using interpolative feedback identification allows for more accurate placement of the notch filter at the frequency of the feedback signal, and thus is more accurately configured for filtering-out the feedback signal.

FIG. 10 illustrates an example of interpolation by generating a polynomial which models the original main lobe of the frequency spectrum, where the interpolation is carried-out by solving for a maximum of the polynomial by derivation. One skilled in the art would realize that any interpolation techniques may be utilized to identify the feedback frequency. For example, additional frequency bins may be interspaced between samples of the sample frequency domain signal shown in FIG. 10, each interspaced bin having zero energy value. The sampled frequency domain signal may then be passed through a low pass filter resulting in an interpolated sampled spectrum. Using the interpolated sampled spectrum, one could identify a maximum of the filtered frequency spectrum to obtain a more accurate estimate of the feedback signal frequency.

Figure 11:
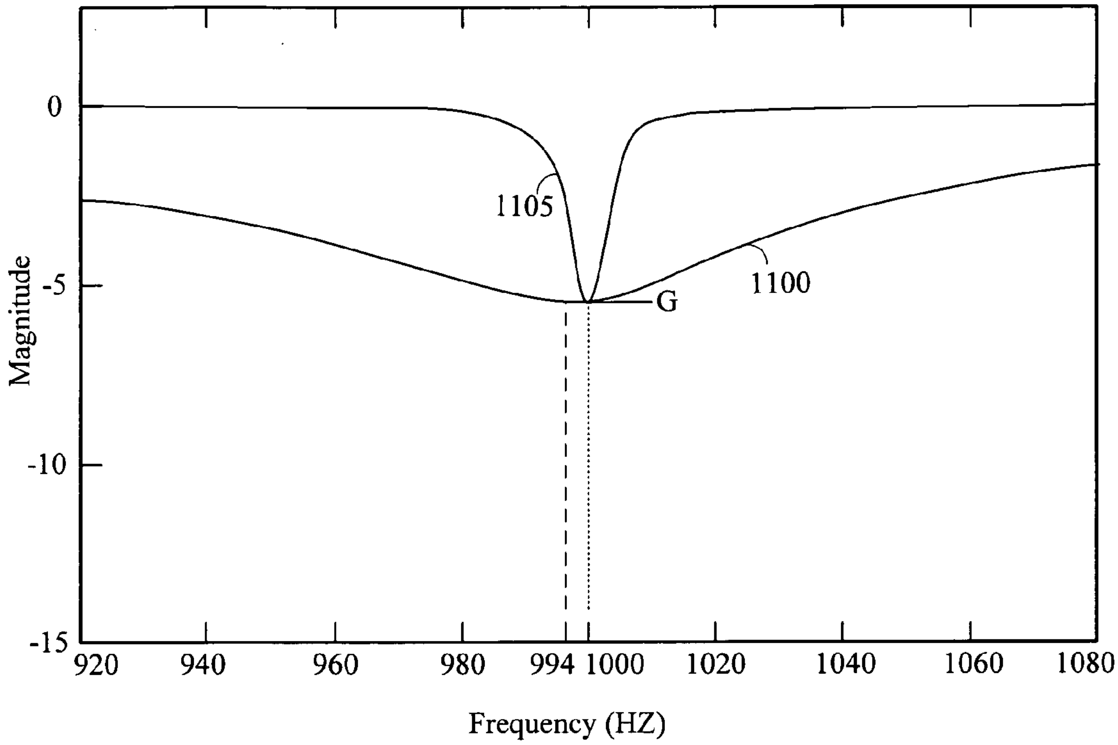
FIG. 11 is a graph comparing characteristics of prior art notch filters with a notch filter configured using interpolative feedback identification.
Figure 12:
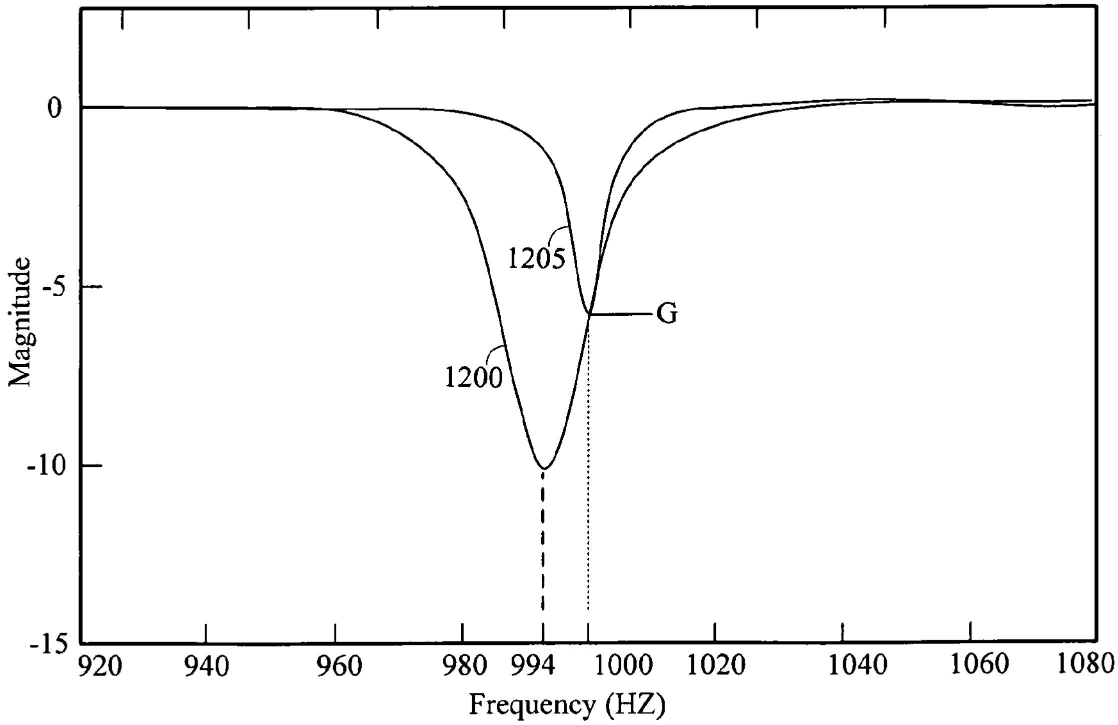
FIG. 12 is another graph comparing characteristics of a prior art notch filter, with a notch filter configured using interpolative feedback identification.

FIGS. 11 and 12 illustrate graphs comparing characteristics of prior art notch filters with notch filters configured in accordance with interpolative feedback identification. The sampled frequency bin having a maximum amplitude $B_p$ in FIG. 10, may correspond to 994 Hz in FIGS. 11 and 12. A more accurate representation of the frequency of the feedback signal, $B_{estimate}$ in FIG. 10, may correspond to 1000 Hz in FIGS. 11 and 12. The sampled frequency bins and frequency of the feedback signal may have other frequencies. As shown at FIGS. 11 and 12, prior art feedback identification techniques result in a notch filter being configured to filter out frequencies at the maximum bin frequency 994 Hz, and thus must have an increased bandwidth as shown by line 1100 FIG. 11, or increased cut-depth as shown by line 1200 of FIG. 12, to ensure that the gain (G) of the filter at the actual frequency of the feedback is sufficient for filtering the feedback signal.

In contrast, feedback identification techniques using interpolative feedback identification provide a more accurate representation (here about 1000 Hz) of the actual frequency of feedback. Accordingly, a notch filter having characteristics shown at 1105 and 1205 of FIGS. 11 and 12 may be placed at the more accurate estimate for the actual frequency of the feedback signal. Because the filter is more accurately placed, it may be more narrowly tailored (i.e. reduced bandwidth and/or cut-depth) while ensuring that the gain is sufficient at the frequency of the feedback signal to eliminate or reduce the feedback signal, and having little or no effect on the quality of the signal provided at the loudspeaker 108, or in any event, less of an effect on the audio quality than notch filters configured using prior art feedback identification techniques.

Figure 13:
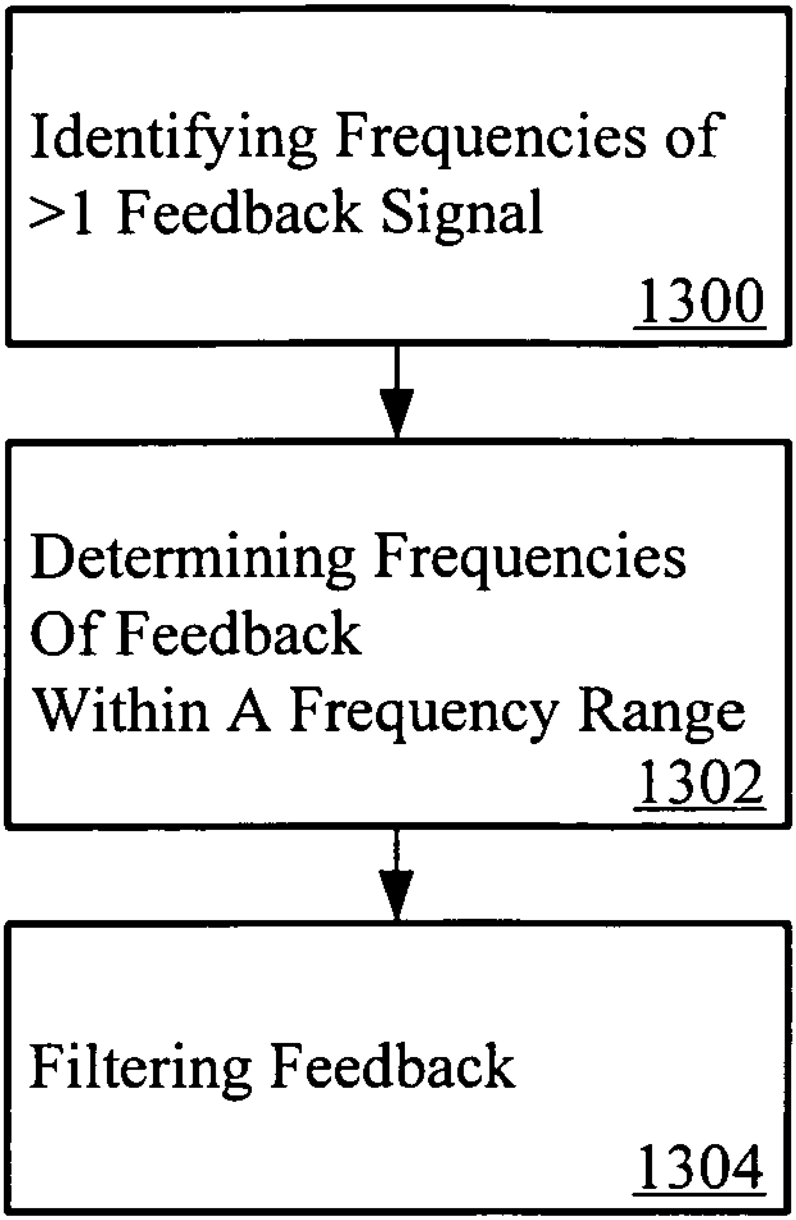
FIG. 13 is a flow chart illustrating operation of the audio system of FIG. 1 for performing adaptive filtering.

FIG. 13 is a flow chart of a method for providing adaptive filtering of feedback in an audio system. Frequencies of a plurality of feedback signals are identified/estimated by the microprocessor 104. Such frequencies may be identified as described above using interpolative feedback identification, or in any other fashion. The microprocessor 104 determines 1302 whether the frequencies of feedback signals are within a frequency window covering a specified frequency range. The frequency range covered by the frequency window may be predetermined and/or configurable, and may vary depending on the frequency band being examined. The specified frequency range covered by the frequency window will be discussed further below with respect to FIGS. 14 and 15.

The microprocessor 104 filters 1304 the feedback signal within the frequency range covered by the frequency window. The microprocessor 104 configures a filter for filtering out any frequencies a feedback signal determines to be within the frequency range. The filter may be a notch filter or other type of filter. The microprocessor may determine filter coefficients such as quality factor, cut-depth and a center frequency for the filter.

Figure 14:
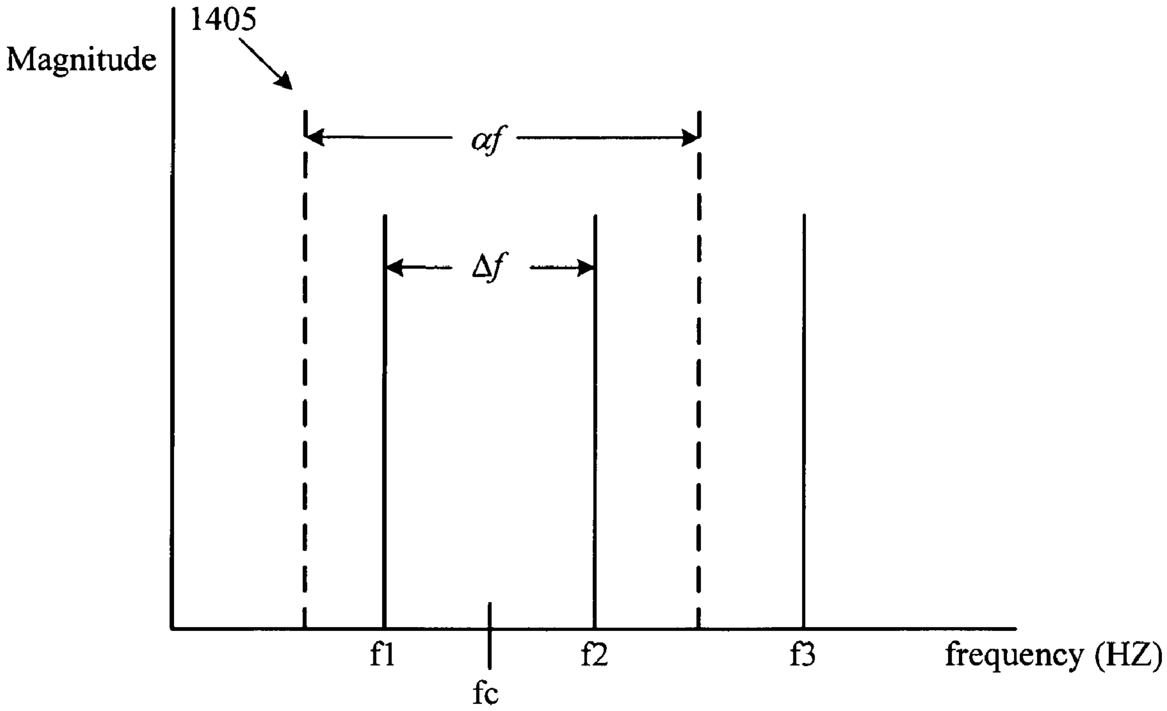
FIG. 14 is a graph illustrating a frequency window covering a specified frequency range for a time-domain signal, which may be utilized in performing adaptive filtering.

FIG. 14 is a graph illustrating a frequency window covering a specified frequency range for time-domain representations of feedback signals, which may be utilized in providing the adaptive filtering discussed above with respect to FIG. 13. As shown in FIG. 14, a frequency window represented generally at 1405 may cover a specified frequency range, for example, αf. Where two feedback frequencies, for example feedback frequency f1 and feedback frequency f2 lie within the frequency window 1405, it may be determined 1302 that adaptive filtering will be utilized to configure a single filter to filter out the feedback frequencies.

To determine whether the feedback frequencies lie within the frequency window 1405, a frequency differential Δf may be determined between feedback frequencies, for example by subtracting one frequency from another. For example, as shown in FIG. 14, Δf may be determined by subtracting the frequency f1 representing a first frequency at which feedback is located from f2 representing a second frequency at which feedback is located. Where the value Δf is less than αf, and thus the frequency range covered by the frequency window 1405, it may be determined that the feedback located at frequencies f1 and f2 may be adaptively filtered by a single filter.

A filter may be configured, for example by the microprocessor 104 at a center frequency fc within the frequency window 1405 having sufficient quality factor and/or cut-depth to filter out the feedback at the frequencies f1 and f2.

Concurrently or subsequently, if a feedback signal is identified as being located at a frequency f3, for example as shown in FIG. 14, the microprocessor 104 may determine whether the frequency differential Δf between f3 and fc is less than the frequency range αf covered by the frequency window 1405. Where it is determined that the newly calculated Δf is less than αf, the microprocessor 104 may determine that the feedback identified at f3 may be adaptively filtered utilizing the filter at fc, and thus reconfigure the filter centered at fc (i.e., reconfigure the quality factor, cut-depth and/or fc) to filter out the feedback identified at the frequencies f1, f2 and f3.

Alternatively, instead of determining the frequency differential between f3 and fc, the microprocessor 104 may instead determine a frequency differential Δf between f3 and f1 for comparing with the frequency range αf of the frequency window 1405 in determining whether the feedback frequencies f1, f2 and f3 may be adaptively filtered by a single filter. As additional feedback frequencies are concurrently and/or subsequently identified, the microprocessor 104 may determine whether to employ additional filters, or to utilize existing filters to cover the concurrently or subsequently identified frequencies of feedback.

In addition, the microprocessor 104 may further utilize algorithms that may minimize the number of filters necessary to filter out the identified feedback frequencies. In FIG. 14, the frequency of the feedback frequency f1 may be 10000 Hz, where the feedback frequency f2 may be 1012 Hz and the feedback frequency f3 may be 1024 Hz. The specified frequency range αf of the frequency window 1405 may be any value, for example, 6 Hz, 12 Hz, 20 Hz, 100 Hz or any other value. The specified frequency range αf may vary across the frequency spectrum, as a function of the frequency of the particular feedback frequencies being examined. For example, the frequency range αf may increase logarithmically as the particular frequency being examined for feedback increases. Thus, at lower frequencies, αf may have a smaller value than αf at higher frequencies. In addition, the value of αf defining the frequency window 1405 may be configurable by a user of the system 100.

The graph of FIG. 14 describes how the determining 1302 may be accomplished for feedback signals represented in the time-domain. The determining 1310 may similarly be carried-out for identified feedback signals in the frequency domain, for example as described with respect to the graph of FIG. 15.

Figure 15:
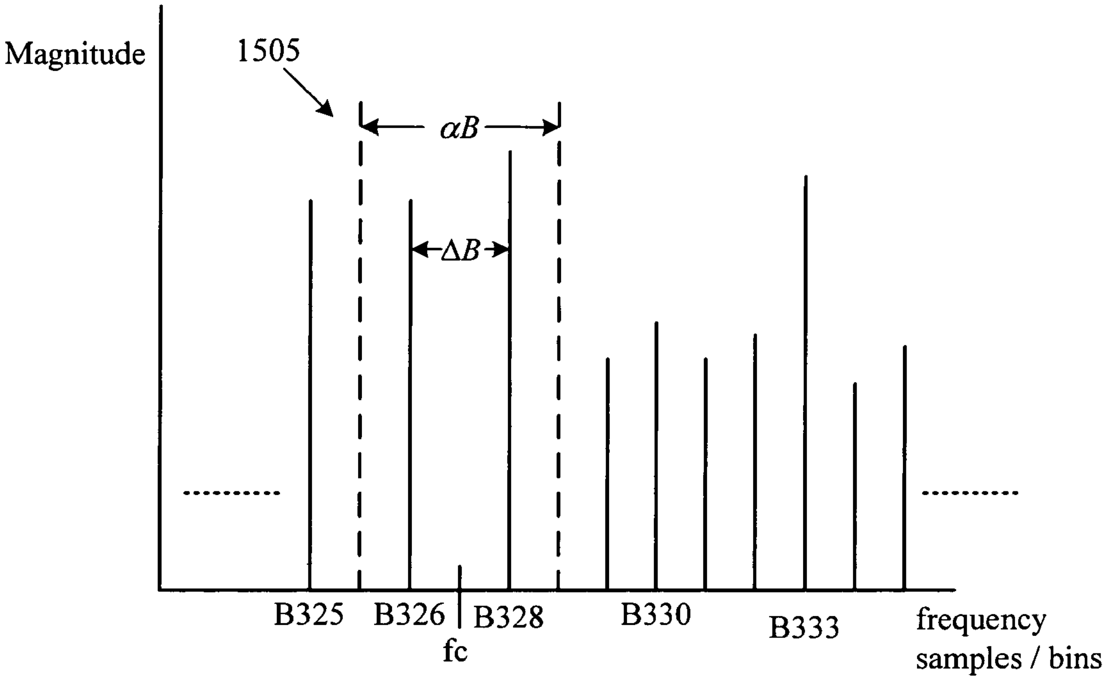
FIG. 15 is a graph illustrating a frequency window covering a specified frequency range for a frequency-domain signal, which may be utilized in performing adaptive filtering.

FIG. 15 is a graph illustrating a frequency window covering a specified frequency range for frequency domain representations of feedback signals, which may be utilized for the adaptive filtration discussed above. A frequency window 1505 is shown, covering a specified frequency range represented by a particular number of frequency bins (i.e., frequency samples) αB. To determine 1302 whether the feedback frequencies lie within the frequency window 1505, a frequency differential represented here as a number of frequency bins, ΔB, may be determined between feedback frequency bins, for example by subtracting one feedback frequency bin from another. As shown in FIG. 15, ΔB may be determined by subtracting the frequency bin# B328 representing a first frequency at which feedback is located from the frequency bin# B326 representing a second frequency at which feedback is located. Where the value ΔB is less than αB, and thus the frequency range covered by the frequency window 1505, it may be determined that the feedback located at frequency bins B328 and B326 may be adaptively filtered by a single filter.

A filter may be configured, for example by the microprocessor 104 at a center frequency fc within the frequency window 1505 having sufficient quality factor and/or cut-depth to filter out the feedback at the frequency bins B326 and B328.

Concurrently or subsequently, if a feedback signal is identified as being located at a frequency bin #B333, for example as shown in FIG. 15, the microprocessor 104 may determine whether the frequency differential ΔB between the frequency bin #B333 and fc is less than the specified frequency range αB covered by the frequency window 1505. Where it is determined that the newly calculated ΔB is less than αB, the microprocessor 104 may determine that the feedback identified at frequency bin #B333 may be adaptively filtered utilizing the filter at fc. The microprocessor 104 may reconfigure the filter centered at a center frequency fc (i.e., reconfigure the quality factor, cut-depth and/or fc) to filter out the feedback identified at the frequencies represented by frequency bins 326, 328 and 333. In FIG. 15, the center frequency fc is shown, by example, at bin #B327.

Similar to as discussed above with respect to FIG. 14, instead of determining the frequency differential between bin #B333 and fc, the microprocessor 104 may instead determine a frequency differential ΔB between bins B333 and B326. This frequency differential ΔB may be compared with the frequency range αB of the frequency window 1505 to determine whether the feedback frequencies represented at bins B326, B328 and B333 may be adaptively filtered by a single filter. As additional feedback frequencies are concurrently and/or subsequently identified, the microprocessor 104 may determine whether to employ additional filters, or to utilize existing filters to cover the concurrently or subsequently identified frequencies of feedback.

Additionally, and as discussed above, the microprocessor 104 may further utilize algorithms that may minimize the number of filters necessary to filter out the identified feedback frequencies. The specified frequency range αB of the frequency window 1505 is shown in FIG. 15 as being 3 frequency bins, where the bin #326 may represent a frequency sample at 1000 Hz, and spacing between frequency samples/bins may be approximately 6 Hz. However, similar to as discussed above with respect to FIG. 14, it will be appreciated by one skilled in the art that αB may be any number of frequency bins, for example 2, 3, 5 or 10 frequency bins, and that the frequency differential represented by αB may vary as a function of the feedback frequencies being examined. In addition, the value of αB defining the frequency window 1505 may be configurable by a user of the system 100.

Figure 16:
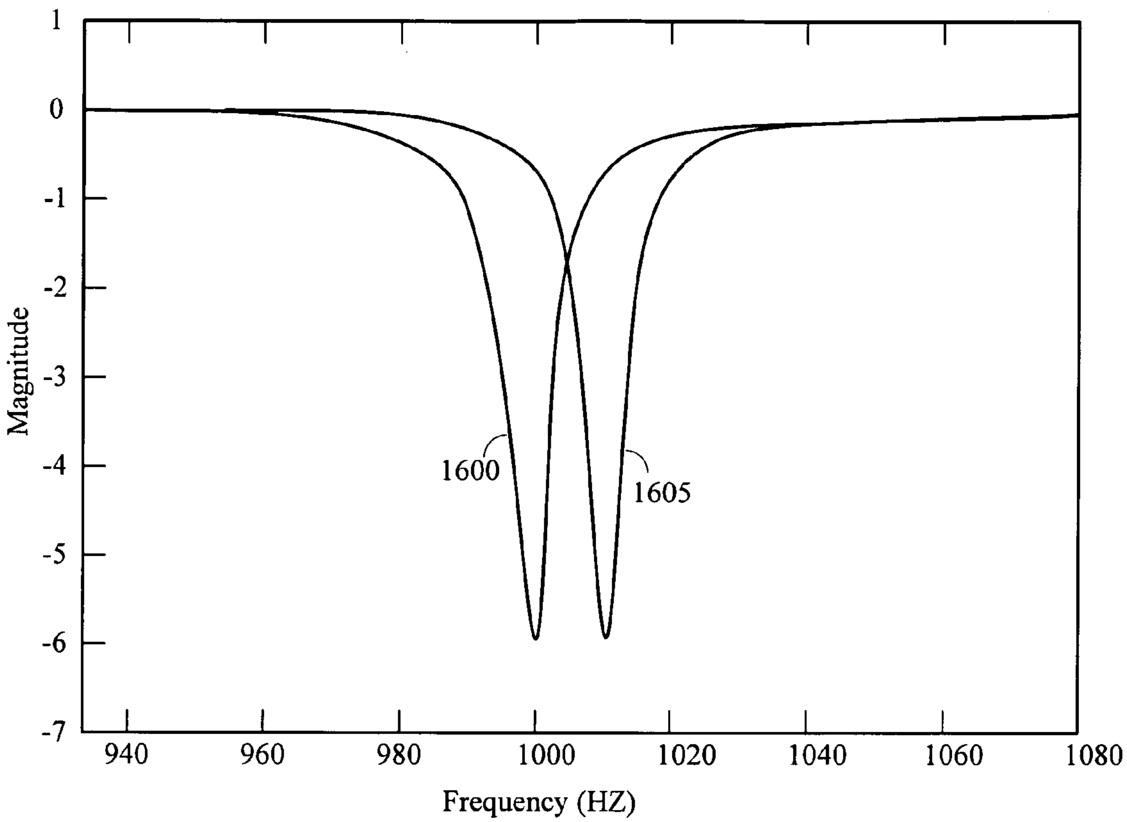
FIG. 16 is a graph illustrating characteristics for two notch filters for filtering corresponding feedback signals.

FIG. 16 illustrates a graph showing characteristics of adjacently placed notch filters that may benefit from the adaptive filtering discussed herein. Feedback has been identified at frequencies of f1 equal to about 1000 and f2 equal to about 1012 Hz. To eliminate the feedback identified at these frequencies, notch filters may be utilized having the characteristics 1600 and 1605. The characteristics 1600 include a Quality Factor equal to about 128 and a cut-depth equal to about −6 dB to eliminate or reduce the feedback. The characteristics 1605 include a Qualify Factor equal to about 128 and a cut-depth equal to about −6 dB to eliminate or reduce the feedback. However, in utilizing adaptive filtering, microprocessor 104 is capable of determining that the frequency differential Δf between feedback frequencies at frequencies f1 and f2 are within a frequency range αf defining a frequency window, where αf may be 15 Hz. Microprocessor 104 may configure a single notch filter to filter out the feedback from both identified feedback frequencies.

Figure 17:
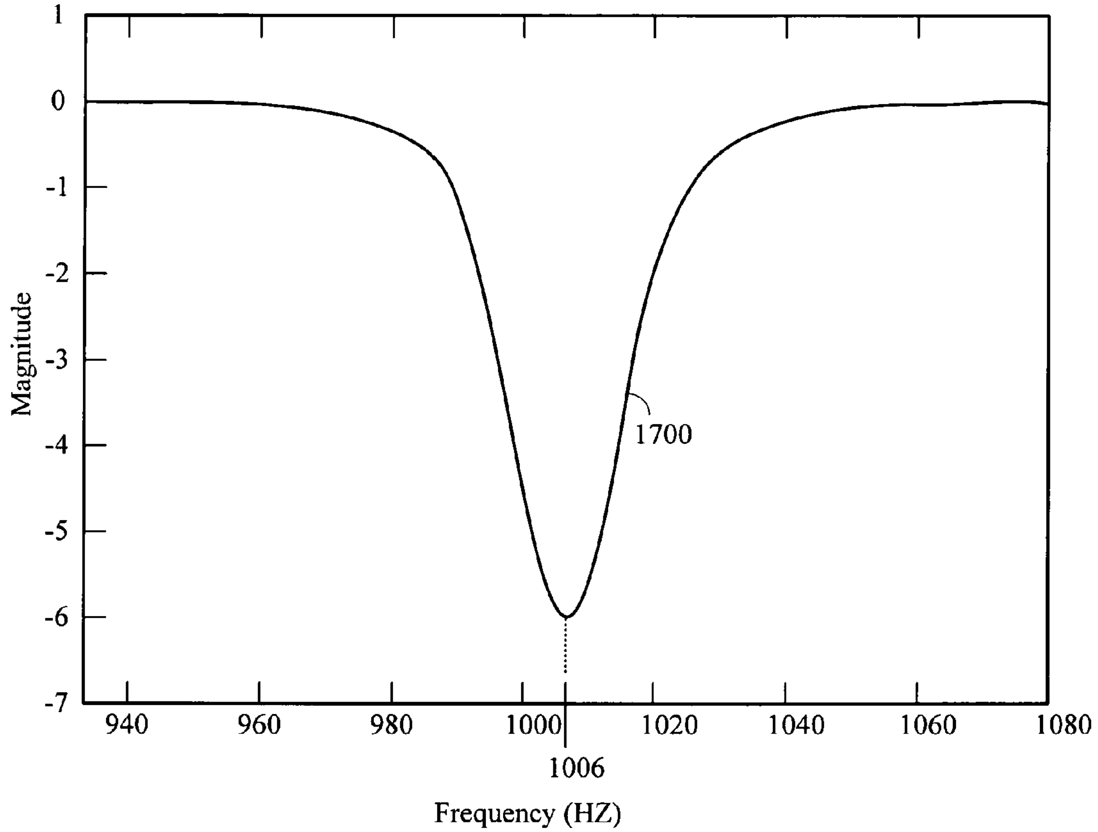
FIG. 17 is a graph illustrating characteristics of a notch filter configured for adaptively filtering two feedback signals.

In FIG. 17, characteristics of a notch filter configured by the microprocessor 104 is shown at 1700. The characteristics indicate a notch filter designed for a center frequency fc of about 1006 Hz and having a Quality Factor of equal to about 45, and a cut-depth equal to about −6 dB. The notch filter is placed between the two identified frequencies, here f1 at about 1000 Hz and f2 at about 1012 Hz, to filter out the feedback signal frequencies. The notch filter may be placed (i.e. designed with a center frequency) at a midpoint of the frequencies of identified feedback, here about 1006 Hz. The notch filter may be placed at any other frequency between the identified feedback frequencies, or within the frequency window being examined (not shown), sufficient for filtering out the identified feedback. Where more than two frequencies of feedback signals are determined to fall within the frequency range αf, an average frequency may be calculated for the determined frequencies of feedback, where the filter is placed at the average frequency. Alternatively, a midpoint frequency between the greatest and lowest frequencies determined to be within the frequency range αf defining the frequency window may be selected for placement of the notch filter.

Thus, instead of requiring two or more notch filters to filter out multiple feedback signals within the frequency window defined by the frequency range αf, a single notch filter may be utilized. Hence, the other notch filter(s) available in the audio system may be used to eliminate or reduce feedback at other frequencies. Rather than having additional notch filters, reducing the number of notch filters for filtering feedback signals may reduce the memory and/or processing requirements of microprocessor 104. The filtering may be accomplished as software executed on the microprocessor 104.

Further, multiple sets of frequencies of feedback signals may be identified by the microprocessor 104, where the microprocessor 104 configures a notch filter to filter the feedback signals corresponding to each set of feedback frequencies.

The audio system 100 discussed above may be utilized in cellular telephones, public address systems, speakerphones having duplex operation, or any other audio system that may suffer from feedback. The microphone 102 may be any input transducer sufficient for receiving audio into the audio system 100. The microprocessor 104 may be any microprocessor capable of performing the functionality/processing, including converting time-domain signals to sampled frequency domain signals. Further, although not shown, the microprocessor 104 may include, or may be coupled with, an external storage media such as computer memory that may include computer programming, executable on the microprocessor 104, for carrying out one or more of the functionalities described herein. The storage medium may be magnetic, optical or any other storage media capable of providing programming for the microprocessor 104.

The loudspeaker 108 may be any speaker capable of providing the output audio from the audio system 100. Alternatively, hardware components not shown may be coupled with the microprocessor 104 for performing the sampled frequency domain conversion where the microprocessor 104 does not possess such functionality. The filtering may be accomplished using software, hardware or a combination, and need not be limited to notch filtering techniques. The software may be executable on a microprocessor such as performing digital signal processing or the like. The hardware may be coupled with the microprocessor 104, which may configure the hardware to achieve desired processing and/or filtering characteristics.

In addition, the values illustrated and discussed in relation to the Figures are exemplary, and are not limitations on the feedback identification and elimination or reduction system. Further, the value for the frequency range $\alpha f$ with respect to adaptive filtering may be any value while achieving at least some of the advantages discussed herein. The frequency range $\alpha f/\alpha B$ may be increased (made larger) to reduce the number of filters required to eliminate feedback. A lower number of filters may be desired where the number of feedback signals outnumber the number of filters available for filtering feedback, or where a processor performing the filtering has limited memory and/or processing capabilities. The frequency window defined by the frequency range $\alpha f/\alpha B$ may be determined based on considerations within the particular audio system utilized, and may be user-configurable. Such considerations may include selection of a frequency range which allows frequencies of feedback signals to be combined without unduly affecting the audio quality provided by the audio system. However, different audio systems have varying requirements as to the audio quality provided thereby. For example, a public address system may have less stringent audio quality requirements than an audio system that may be used in a concert hall or the like. A larger frequency range value $\alpha f/\alpha B$ may be desired for the former than for the latter to account for desired audio quality.

Further, one skilled would realize that various techniques may be employed in identifying which frequencies of feedback within the frequency range $\alpha f/\alpha B$. Further, the microprocessor may utilize various techniques in grouping identified feedback signal sets which are each to be filtered by a single filter, where the technique may minimize the number of filters required for filtering the identified feedback signals.

The audio system 100 may perform both interpolative feedback identification in identifying frequencies of feedback signals, and adaptive filtration for configuring a filter-to-filter out multiple frequencies of feedback signals. The audio system 100 need not perform the feedback identification using interpolative feedback identification and/or the adaptive filtering. Rather, the audio system 100 may be utilized in identifying the frequencies of feedback using interpolative feedback identification while being coupled with additional hardware or microprocessing capabilities which are utilized in eliminating or reducing the identified frequencies of feedback. The hardware may include adaptive filtering. Further, the audio system 100 may perform adaptive filtering using frequencies of feedback identified by external hardware or a processing functionality (which may or may not include feedback frequencies identified using the interpolative feedback identification).

The illustrations have been discussed with reference to functional blocks identified as modules and components that are not intended to represent discrete structures and may be combined or further sub-divided. In addition, while various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A method for processing an audio feedback signal, comprising:

receiving a time domain audio signal;

converting the time domain audio signal to a frequency domain signal;

applying an interpolative feedback identification to a feedback signal within the audio signal by generating a polynomial responsive to samples of the frequency domain signal; and Identifying a frequency of the feedback signal between the samples of the frequency domain signal by solving for a maximum of the polynomial generated by the interpolative feedback identification to identify the frequency.

2. The method of claim 1, further comprising verifying that the identified frequency has a greater magnitude than the samples of the frequency domain signal.

3. The method of claim 1, further comprising:

calculating coefficients for a notch filter responsive to the identified frequency of the feedback signal; and filtering out the identified frequency of the feedback signal using the notch filter.

4. The method of claim 3, further comprising minimizing at least one of a bandwidth and a cut-depth of the notch filter responsive to the identified frequency of the feedback signal.

5. The method of claim 1, further comprising filtering the audio signal to eliminate the identified frequency responsive to the interpolative feedback identification.

6. The method of claim 1, where there are a plurality of feedback signals within the audio signal, and further comprising identifying a plurality of frequencies corresponding to the plurality of feedback signals responsive to the interpolative feedback identification.

7. The method of claim 6, further comprising filtering the audio signal to eliminate the plurality of frequencies of identified feedback responsive to the interpolative feedback identification.

8. The method of claim 6, further comprising adaptively filtering at least two adjacent identified frequencies of feedback signals responsive to the interpolative feedback identification with a single filter by configuring the filter to filter the at least two adjacent identified frequencies.

9. The method of claim 8, where the filter is a notch filter, and further comprising determining coefficients for the notch filter to minimize at least one of a bandwidth and a cut-depth of the notch filter responsive to the identified frequencies of the feedback signal.

10. The method of claim 8, further comprising selecting the at least two adjacent identified frequencies of feedback within a specified frequency range.

11. The method of claim 10, where the specified frequency range is variable responsive to a feedback frequency being examined.

12. The method of claim 8, further comprising:

determining a minimum identified frequency and a maximum identified frequency which will be filtered;

selecting an interior frequency between the minimum identified frequency and the maximum identified frequency; and configuring the filter at the selected interior frequency.

13. An audio system comprising:

an audio signal port for receiving a time domain audio signal;

a processor coupled with the signal port and operable to convert the time domain audio signal to a frequency domain signal, applying interpolative feedback identification to a feedback signal within the audio signal by generating a polynomial responsive to samples of the frequency domain signal, and identify a frequency of a feedback signal between the samples of the frequency domain signal by solving for a maximum of the polynomial generated by the interpolative feedback identification to identity the frequency.

14. The audio system of claim 13, where the processor is further operable to identify the frequency of the feedback signal responsive to the interpolative feedback identification by verifying that the identified frequency has a greater energy magnitude than the samples of the frequency domain signal.

15. The audio system of claim 13, where the processor is further operable to calculate coefficients for a notch filter responsive to the identified frequency of the feedback signal.

16. The audio system of claim 15, where the processor is further operable to calculate coefficients for the notch filter by minimizing at least one of a bandwidth and a cut-depth of the notch filter responsive to the identified frequency of the feedback signal.

17. The audio system of claim 13, further comprising a filter coupled with the processor and the audio signal port, and operable to filter the audio signal to reduce feedback at the identified frequency responsive to the interpolative feedback identification.

18. The audio system of claim 17, where the filter comprises a notch filter tuned to the identified frequency of the feedback signal.

19. The audio system of claim 13, where there are a plurality of feedback signals within the audio signal, and the processor is further operable to apply interpolative feedback identification to the plurality of feedback signals, and identifies a plurality of frequencies corresponding to the plurality of feedback signals responsive to the interpolative feedback identification.

20. The audio system of claim 19, further comprising a plurality of filters coupled with the processor and the audio signal port, and operable to filter the audio signal to eliminate the identified feedback responsive to the interpolative audio.

21. The audio system of claim 19, further comprising a filter coupled with the processor and the audio signal port, where the processor is further operable to adaptively filter at least two adjacent identified frequencies of feedback signals by configuring a filter to filter the at least two adjacent identified frequencies, responsive to the interpolative audio.

22. The audio system of claim 21, where the filter comprises a notch filter, and the processor is further operable to configure the notch filter by determining coefficients for the notch filter to minimize at least one of a bandwidth and a cut-depth of the notch filter responsive to the identified frequencies of the feedback signal.

23. The audio system of claim 21, where the processor is further operable to adaptively filter the at least two adjacent identified frequencies by selecting the at least two adjacent identified frequencies of feedback within a specified frequency range.

24. The audio system of claim 23, where the specified frequency range is variable responsive to a feedback frequency being examined.

25. The audio system of claim 21, where the processor is further operable to adaptively filter the at least two adjacent identified frequencies of feedback signals by determining a minimum identified frequency and a maximum identified frequency which will be filtered by the filter, selecting an interior frequency between the minimum identified frequency and the maximum identified frequency, and configuring the filter for filtering at the selected interior frequency.

26. The audio system of claim 21, where the system includes a computer readable medium storing a computer program to apply the interpolative feedback identification to the feedback signal and identifying the frequency of the feedback signal responsive to the interpolative feedback identification.

27. A method of processing audio feedback, comprising:

receiving an audio signal including multiple feedback signals;

identifying a plurality of feedback frequencies, each feedback frequency corresponding to one of the feedback signals;

determining whether at least two feedback frequencies of the plurality of feedback frequencies lie within a specified frequency range; and configuring a filter responsive to the determination such that the filter is operable to filter out the at least two determined feedback frequencies.

28. The method of claim 27, further comprising configuring a notch filter to filter out the at least two determined frequencies.

29. The method of claim 27, further comprising determining at least one of a bandwidth, cut-depth and center frequency of the filter.

30. The method of claim 29, further comprising selecting a center frequency for the filter which is an average of the at least two feedback frequencies.

31. The method of claim 27 further comprising determining whether at least two adjacent feedback frequencies lie within the specified frequency range.

32. The method of claim 27, further comprising determining whether only two feedback frequencies lie within the specified frequency range.

33. The method of claim 27 where the specified frequency range is variable responsive to a feedback frequency being examined.

34. The method of claim 27, further comprising applying interpolative feedback identification to at least one of the feedback signals, and identifying at least one of the feedback frequencies responsive to the interpolative feedback identification.

35. A computer readable medium storing a computer program operable to:

receive a time domain audio signal, convert the time domain audio signal to a frequency domain signal, apply an interpolative feedback identification to a feedback signal within the audio signal by generating a polynomial responsive to samples of the frequency domain signal, and identify a frequency of the feedback signal between samples of the frequency domain signal by solving for a maximum of the polynomial generated by the interpolative feedback identification to identify the frequency of the feedback signal.

36. The storage media of claim 35, where the computer program is further operable to filter the identified frequency of the feedback signal by calculating coefficients for a filter responsive to the identified frequency of the feedback signal.

37. The computer readable medium of claim 36 where the filter approximates a notch filter, and where the computer program is further operable to minimize at least one of a bandwidth and a cut-depth of the approximated notch filter responsive to the identified frequency of the feedback signal.

38. A computer readable medium storing a computer program operable to:

receive an audio signal including multiple feedback frequencies;

identify a plurality of feedback frequencies, each feedback frequency corresponding to one of the feedback signals;

determine whether at least two feedback frequencies of the plurality of feedback frequencies lie within a specified frequency range; and configure a filter such that the filter is operable to filter out the at least two determined feedback frequencies responsive to the determination.

39. The computer readable medium of claim 38, where the computer program is further operable to configure a notch filter to filter out the at least two determined frequencies.

40. The computer readable medium of claim 39, where the computer program is further operable to approximate the notch filter.

41. The computer readable medium of claim 38, where the computer program is further operable to apply interpolative feedback identification on at least one feedback signal, and identify at least one of the feedback frequencies responsive to the interpolative feedback identification.

* * * * *